(12) United States Patent
Suzuki

(10) Patent No.: US 12,526,496 B2
(45) Date of Patent: Jan. 13, 2026

(54) IMAGING DEVICE HAVING PROTRUDING OPTICAL MEMBER AND SLOPED HOUSING

(71) Applicant: NIDEC PRECISION CORPORATION, Tokyo (JP)

(72) Inventor: Yuusuke Suzuki, Tokyo (JP)

(73) Assignee: NIDEC PRECISION CORPORATION, Tokyo (JP)

( * ) Notice: Subject to any disclaimer, the term of this patent is extended or adjusted under 35 U.S.C. 154(b) by 133 days.

(21) Appl. No.: 18/463,292

(22) Filed: Sep. 8, 2023

(65) Prior Publication Data

US 2024/0098351 A1    Mar. 21, 2024

(30) Foreign Application Priority Data

Sep. 16, 2022    (JP) .................................. 2022-148216

(51) Int. Cl.
| | |
|---|---|
| H04N 5/335 | (2011.01) |
| H04N 23/11 | (2023.01) |
| H04N 23/51 | (2023.01) |
| H04N 23/55 | (2023.01) |
| H04N 23/56 | (2023.01) |
| G03B 15/05 | (2021.01) |
| H04N 101/00 | (2006.01) |

(52) U.S. Cl.
CPC ............. *H04N 23/51* (2023.01); *H04N 23/11* (2023.01); *H04N 23/55* (2023.01); *H04N 23/56* (2023.01); *G03B 15/05* (2013.01); *G03B 2215/0571* (2013.01); *H04N 2101/00* (2013.01)

(58) Field of Classification Search
CPC ....................................................... H04N 23/51
See application file for complete search history.

(56) References Cited

U.S. PATENT DOCUMENTS

| | | | |
|---|---|---|---|
| 6,424,803 B1 | 7/2002 | Mikami et al. | |
| 6,574,431 B2 | 6/2003 | Mikami et al. | |
| 7,079,185 B2 | 7/2006 | Koyama et al. | |
| 7,542,089 B2 | 6/2009 | Koyama et al. | |

(Continued)

FOREIGN PATENT DOCUMENTS

| | | |
|---|---|---|
| JP | H11311821 A | 11/1999 |
| JP | H11338008 A | 12/1999 |

(Continued)

*Primary Examiner* — Gary C Vieaux
(74) *Attorney, Agent, or Firm* — HAUPTMAN HAM, LLP

(57) ABSTRACT

An imaging device includes an imaging element that receives subject light, a lens that directs, to the imaging element, the subject light from an imaging range having a predetermined angle of view in at least a first direction, an illuminator including a light source that emits illumination light toward the imaging range and a cover covering the light source, and a housing including a top plate on a plane intersecting with an optical axis of the lens and a bottom surface facing the top plate. The housing accommodates the imaging element and the illuminator. The predetermined angle of view includes a direction from the lens toward the bottom surface in an area of the predetermined angle of view in at least one direction with respect to the optical axis of the lens. The top plate includes a slope with an inclination corresponding to the predetermined angle of view. The cover in the illuminator is parallel to the slope.

6 Claims, 6 Drawing Sheets

(56) References Cited

U.S. PATENT DOCUMENTS

| | | | |
|---|---|---|---|
| 8,363,157 B1 * | 1/2013 | Han | H04N 23/56 |
| | | | 348/370 |
| 9,063,394 B2 | 6/2015 | Umehara | |
| 9,979,870 B2 * | 5/2018 | Park | G03B 15/05 |
| 11,226,466 B2 | 1/2022 | Wang et al. | |
| 2020/0249415 A1 | 8/2020 | Wang et al. | |
| 2021/0099676 A1 * | 4/2021 | England | H04N 7/181 |
| 2022/0006925 A1 * | 1/2022 | Xu | H04N 23/56 |
| 2023/0106722 A1 * | 4/2023 | Huang | H04N 23/51 |
| | | | 348/373 |

FOREIGN PATENT DOCUMENTS

| | | |
|---|---|---|
| JP | 2000162670 A | 6/2000 |
| JP | 2010177869 A | 8/2010 |
| JP | 2015102823 A | 6/2015 |
| JP | 2020005008 A | 1/2020 |

* cited by examiner

IMAGING DEVICE HAVING PROTRUDING OPTICAL MEMBER AND SLOPED HOUSING

RELATED APPLICATIONS

The present application claims priority to Japanese Application Number 2022-148216, filed Sep. 16, 2022, the disclosure of which is hereby incorporated by reference herein in its entirety.

BACKGROUND

Technical Field

The present invention relates to an imaging device.

Description of the Background

Surveillance cameras are installed at various places such as nursing care facilities, hospitals, factories, and stores for crime and disaster prevention. Such surveillance cameras, which are imaging devices, are to have a large angle of view to monitor a wide area.

Patent Literature 1 describes an imaging device incorporated in an electronic device.

CITATION LIST

Patent Literature

Patent Literature 1: U.S. Patent Application Publication No. 2020/0249415

BRIEF SUMMARY

However, this imaging device includes a light shield that is a flat plate and thus has the angle of view of its imager limited to a maximum of 180°. Imaging devices with a light shield and an outer casing shaped to allow imaging with an angle of view exceeding 180° are awaited.

To allow imaging in a dark surrounding environment, an imaging device may include one or more light sources that emit illumination light toward a subject to be monitored. However, an imaging device including multiple light sources may emit illumination light that illuminates a subject less precisely.

An imaging device according to an aspect of the present invention includes an imaging element that receives subject light, an optical member that directs, to the imaging element, the subject light from an imaging range having a predetermined angle of view in at least a first direction, at least one illuminator including a light source that emits illumination light toward the imaging range and a cover covering the light source, and a housing including an outer plate on a plane intersecting with an optical axis of the optical member and a bottom surface facing the outer plate. The housing accommodates the imaging element and the at least one illuminator. The predetermined angle of view includes a direction from the optical member toward the bottom surface in an area of the predetermined angle of view in at least one direction with respect to the optical axis of the optical member. The outer plate includes a slope with an inclination corresponding to the predetermined angle of view. The cover in the at least one illuminator is parallel to the slope.

The imaging device according to the above aspect of the present invention can capture images with an angle of view exceeding 180°.

DETAILED DESCRIPTION

One or more embodiments of the present invention will now be described in detail with reference to the drawings.

An imaging device according to the present embodiment may be used for any purpose and may be installed at, for example, a hospital, a nursing care facility, a factory, and a store as a surveillance camera or a monitoring camera. The imaging device is switchable between a normal imaging mode and a low-light imaging mode based on the brightness level in the external environment surrounding the imaging device. Imaging in the normal imaging mode is performed using light incident on an imaging optical system (optical member) when the external environment is bright. Imaging in the low-light imaging mode is performed using illumination light emitted when the external environment is dark to allow imaging of a subject using the illumination light.

Overall Structure of Imaging Device

Figure 1:
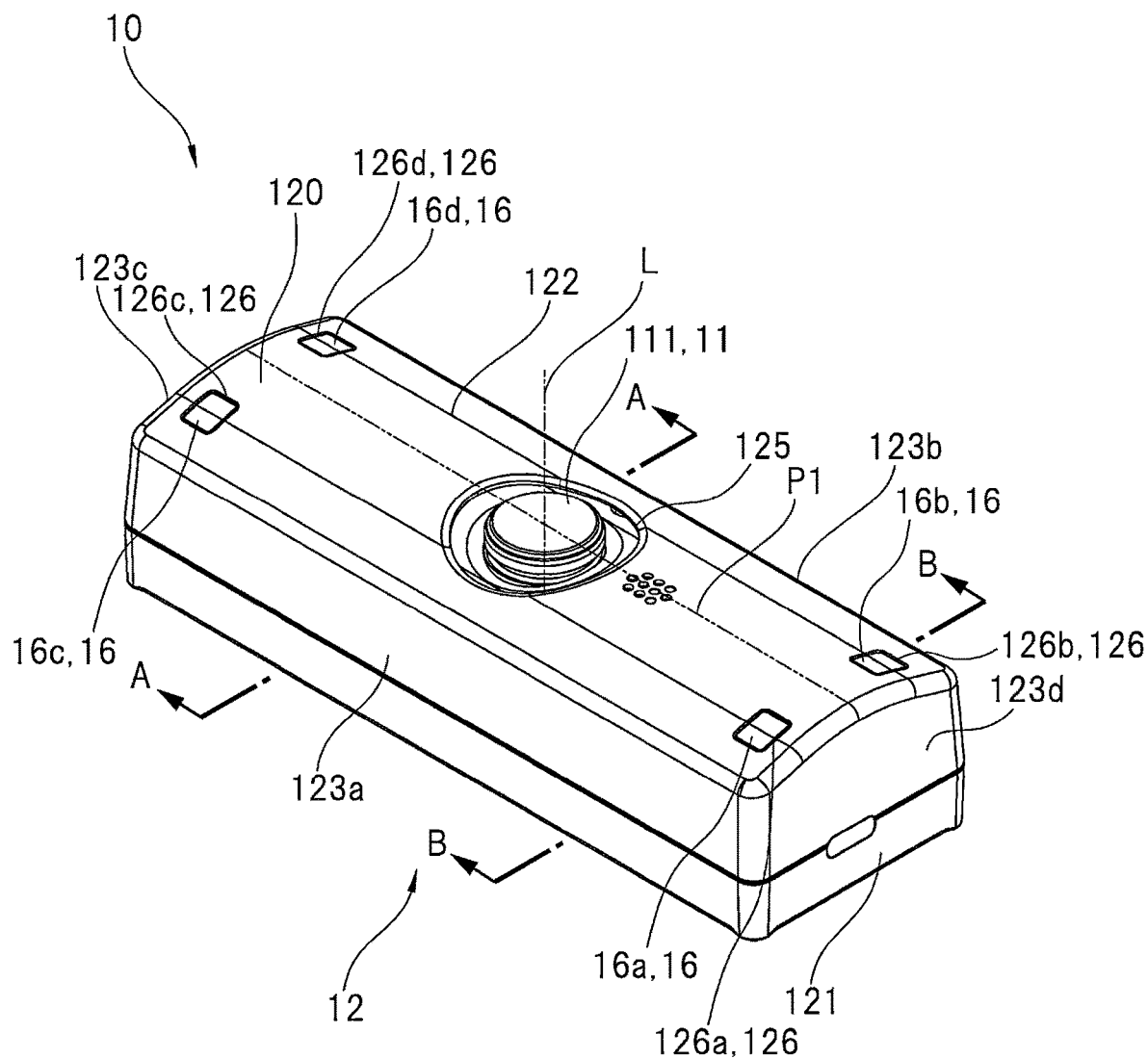
FIG. 1 is an external perspective view of an imaging device according to an embodiment.
Figure 1:
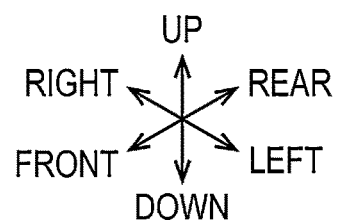
Figure 2A:
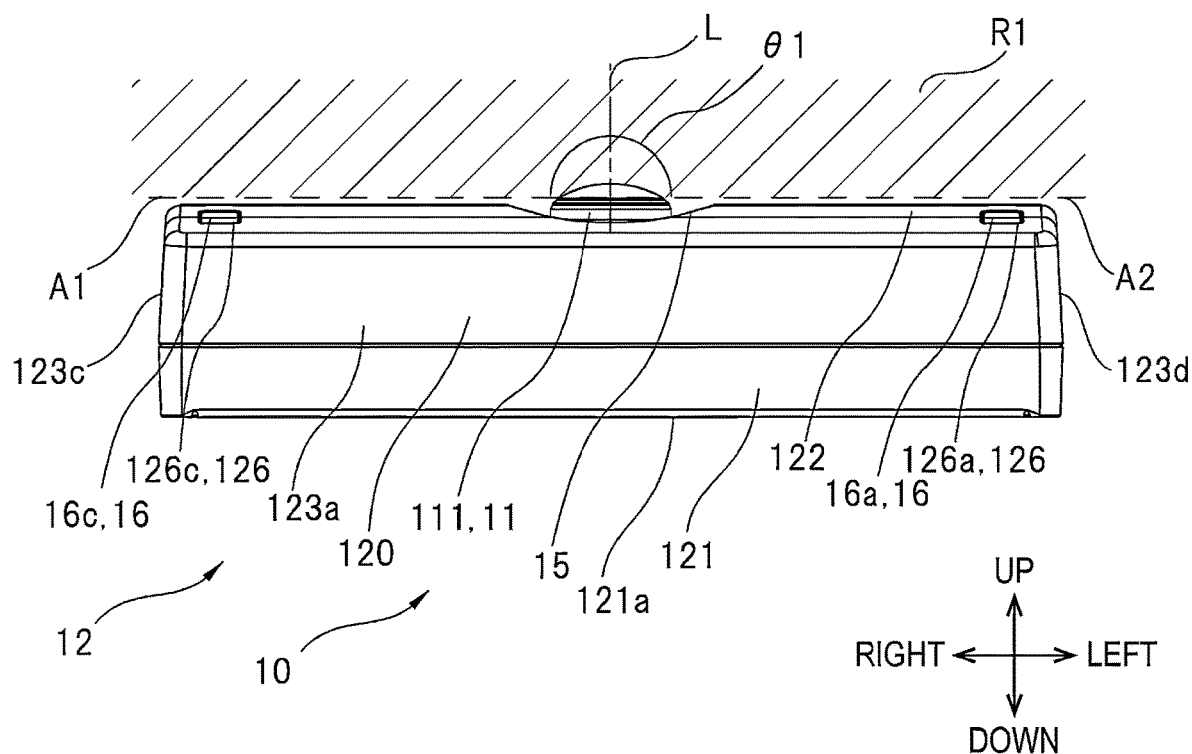
FIG. 2A is a front view of the imaging device.
Figure 2B:
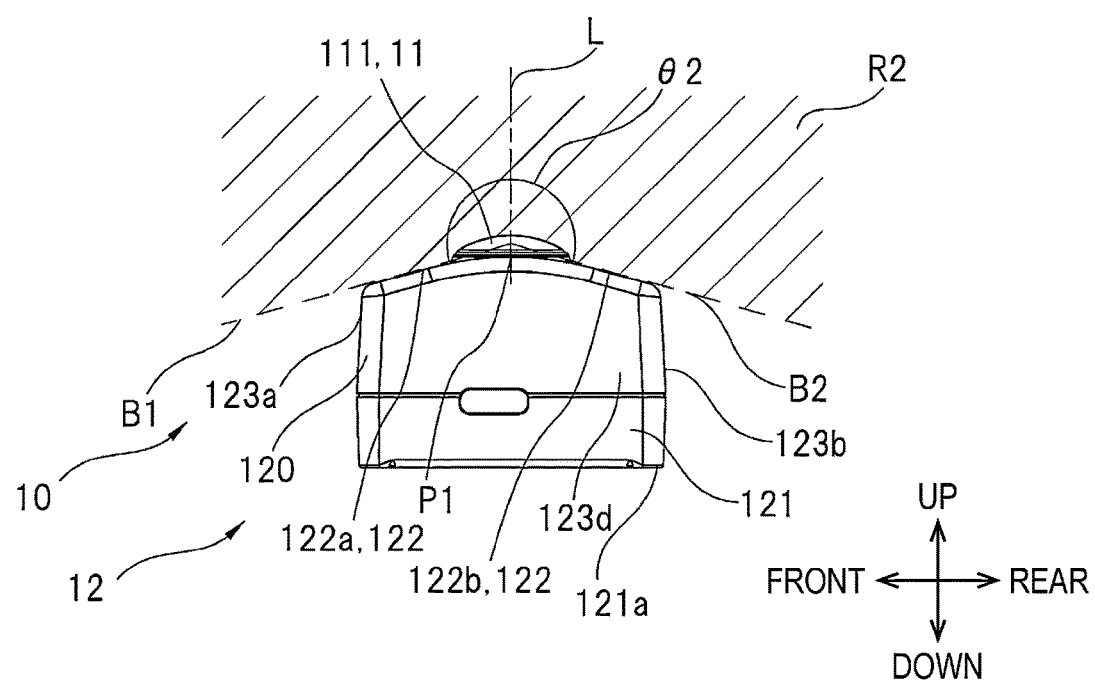
FIG. 2B is a left side view of the imaging device.
Figure 3A:
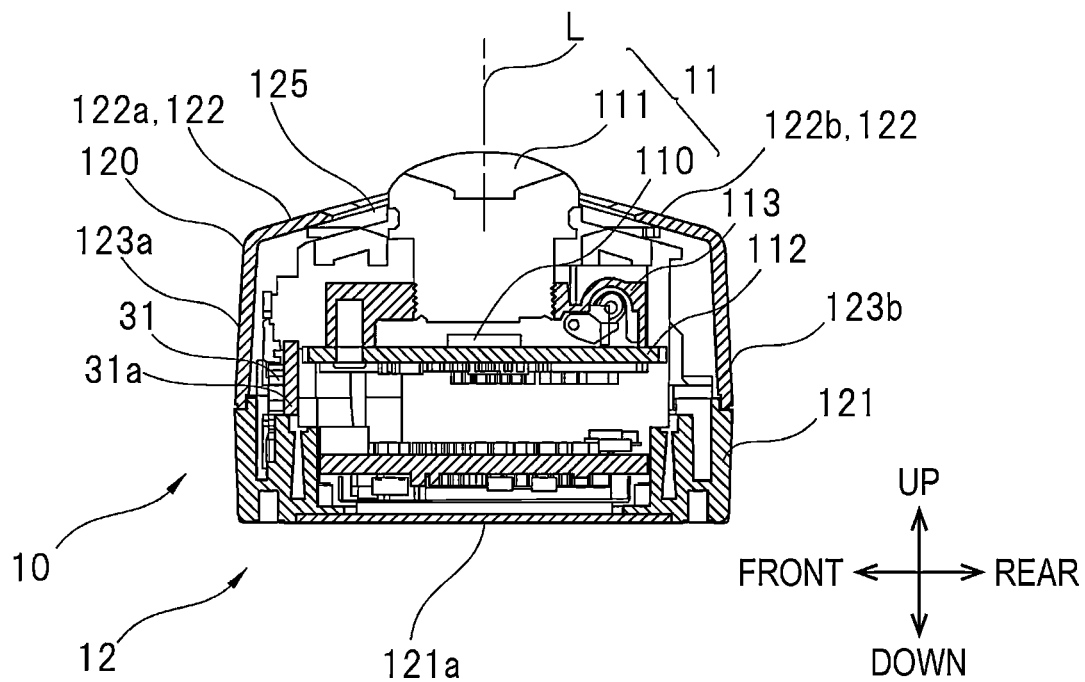
FIG. 3A is a cross-sectional view of the imaging device taken along line A-A in FIG. 1.
Figure 3B:
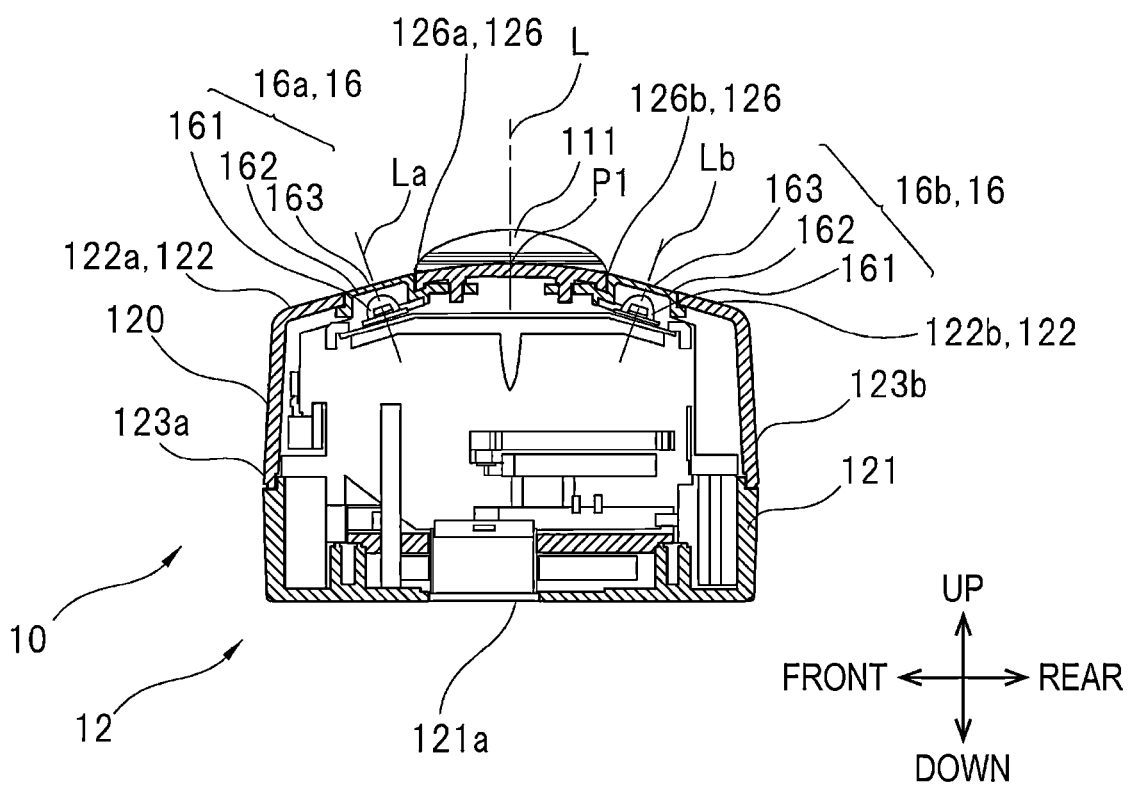
FIG. 3B is a cross-sectional view of the imaging device taken along line B-B in FIG. 1.

FIG. 1 is an external perspective view of an imaging device 10. FIG. 2A is a front view of the imaging device 10. FIG. 2B is a side view of the imaging device 10. FIG. 3A is a cross-sectional view of the imaging device 10 taken along line A-A in FIG. 1. FIG. 3B is a cross-sectional view of the imaging device 10 taken along line B-B in FIG. 1. The imaging device 10 includes a camera module 11, a housing (outer case) 12, illuminators 16, and a control unit 31. As described in detail later, the camera module 11 includes an imaging element 110 and a lens (optical member) 111. As described in detail later, each illuminator 16 includes a light source 161 and a cover 162.

Housing 12

As shown in FIG. 1, the housing 12 includes a front case 120 and a rear case 121. The front case 120 includes a rectangular or substantially rectangular top plate 122 and sidewall plates 123a, 123b, 123c, and 123d that adjoin the sides of the top plate 122. The top plate 122 and the sidewall plates 123a, 123b, 123c, and 123d are integrally formed from a synthetic resin. The sidewall plate 123a adjoins one long side of the top plate 122. The sidewall plate 123b adjoins the other long side of the top plate 122. The sidewall plate 123c adjoins one short side of the top plate 122. The sidewall plate 123d adjoins the other short side of the top plate 122.

Hereafter, the direction in which the front case 120 of the housing 12 is located may be referred to as being upward, the direction in which the rear case 121 is located as being downward, the direction in which the sidewall plate 123a is located as being frontward, the direction in which the sidewall plate 123b is located as being rearward, the direction in which the sidewall plate 123c is located as being rightward, and the direction in which the sidewall plate 123d is located as being leftward. The front-rear direction may be referred to as a first direction, and the right-left direction as a second direction. The first direction intersects with an optical axis L of the lens 111 in the camera module 11 (described later). The second direction intersects with the first direction and the optical axis L. FIG. 2A is a front view of the imaging device 10 as viewed from the sidewall plate 123a (front). FIG. 2B is a side view of the imaging device 10 as viewed from the sidewall plate 123d (left).

As shown in FIG. 1, the top plate 122 of the housing 12 is an outer plate intersecting with the optical axis L of the lens 111 in the camera module 11. The top plate 122 has an opening 125 and four illumination openings 126a, 126b, 126c, and 126d (collectively referred to as illumination openings 126). The opening 125 has a circular or substantially circular shape centered on a point through which the optical axis L of the lens 111 extends. The lens 111 (described later) is placed in the opening 125. In the present embodiment, the optical axis L of the lens 111 extends through the center of the top plate 122. A position on a line extending in the right-left direction (second direction) through the center of the top plate 122 (in other words, the optical axis L of the lens 111) is hereafter referred to as a first reference position P1.

The optical axis L of the lens 111 may not extend through the center of the top plate 122. The optical axis L of the lens 111 may extend through a point shifted rightward or leftward from the center of the top plate 122, or may extend through a point shifted frontward or rearward from the center of the top plate 122.

The top plate 122 has the illumination openings 126 in its four corners. More specifically, the top plate 122 has the illumination opening 126a at the left front. The top plate 122 has the illumination opening 126b at the left rear. The top plate 122 has the illumination opening 126c at the right front. The top plate 122 has the illumination opening 126d at the right rear. The illumination openings 126 allow passage of illumination light emitted from the illuminators 16 (described later) in the housing 12 outside the imaging device 10.

The top plate 122 includes a central portion (in other words, the first reference position P1) protruding upward with respect to its front and rear ends in the front-rear direction. More specifically, the top plate 122 includes a slope 122a inclined downward in the front-rear direction in its portion (one side) from the first reference position P1 to the front end. Similarly, the top plate 122 includes a slope 122b inclined downward in the front-rear direction in its portion (the other side) from the first reference position P1 to the rear end. The top plate 122 is shaped to correspond to the angle of view of the camera module 11 (described later) to allow light from a subject to reach the camera module 11 without vignetting.

The rear case 121 is fastened to the front case 120 and closes the bottom (downward) of the front case 120. The rear case 121 is fastened to the front case 120 with, for example, screws. The rear case 121 has a bottom surface 121a. With the rear case 121 fastened to the front case 120, the bottom surface 121a faces the top plate 122 of the front case 120.

Camera Module 11

As shown in FIG. 3A, the camera module 11 includes the imaging element (image sensor) 110, such as a complementary metal-oxide semiconductor (CMOS) or a charge-coupled device (CCD), and the lens 111. The imaging element 110 is mounted on a substrate 112 and accommodated in the housing 12. The lens 111 is located above the imaging element 110 and held by a lens holder 113. The lens 111 held by the lens holder 113 protrudes upward from the top plate 122 through the opening 125 in the top plate 122 of the housing 12 described above. Below the lens holder 113, the substrate 112 on which the above imaging element 110 is mounted is fastened with, for example, screws.

External subject light reaching the imaging device 10 is guided and focused through the lens 111 onto a light-receiving surface of the imaging element 110. In other words, the lens 111 is an optical member (imaging optical system) that forms an image of an imaging target on the light-receiving surface of the imaging element 110, or at least a part of the optical member. The imaging element 110 converts the brightness of light for the image formed by the lens 111 into electric charge and outputs a signal (image signal) corresponding to the resultant electric charge.

The imaging device 10 including the camera module 11 has the angle of view of 180° in the right-left direction and the angle of view greater than 180° in the front-rear direction. Thus, as described above, the top plate 122 of the housing 12 includes the slopes 122a and 122b that are inclined downward in the portions from the first reference position P1 to the front and rear ends in the front-rear direction. The angle of view of the camera module 11 and the shape of the top plate 122 will now be described in detail.

Shape of Top Plate 122 of Housing 12

The area above boundaries A1 and A2 indicated by broken lines in FIG. 2A is an imaging range R1 in which capturing an image of a subject with the camera module 11 can be performed in the right-left direction. As described above, the camera module 11 has an angle of view $\theta 1$ of 180° in the right-left direction. In other words, the boundaries A1 and A2 are orthogonal to the optical axis L of the lens 111. The top plate 122 of the housing 12 extends in the right-left direction without intersecting with the boundaries A1 and A2. In other words, the top plate 122 is, in the right-left direction, substantially parallel to the boundaries A1 and A2 orthogonal to the optical axis L. This reduces the likelihood of the top plate 122 of the housing 12 causing vignetting over subject light in the right-left direction.

The area defined by boundaries B1 and B2 indicated by broken lines in FIG. 2B is an imaging range R2 in which capturing an image of a subject with the camera module 11 can be performed in the front-rear direction. As described above, the camera module 11 has an angle of view $\theta 2$ greater than 180° in the front-rear direction. In other words, the boundaries B1 and B2 are inclined downward (in other words, toward the bottom surface 121a of the rear case 121) with respect to the optical axis L of the lens 111. In other words, the angle between the boundary B1 and the optical axis L of the lens 111 and the angle between the boundary B2 and the optical axis L of the lens 111 are both greater than 90°.

The top plate 122 extends in the front-rear direction without intersecting with the boundaries B1 and B2. In other words, the top plate 122 is substantially parallel to the boundaries B1 and B2 in the front-rear direction. As described above, the top plate 122 includes the slope 122a inclined downward and parallel to the boundary B1 in the portion from the first reference position P1 to the front end in the front-rear direction. Similarly, the top plate 122 includes the slope 122b inclined downward and parallel to the boundary B2 in the portion from the first reference position P1 to the rear end in the front-rear direction. This reduces the likelihood of the top plate 122 of the housing 12 causing vignetting over subject light in the front-rear direction. The slopes 122a and 122b may not be parallel to the boundaries B1 and B2, and may be inclined more downward than the boundaries B1 and B2. In other words, the slopes 122a and 122b may have any inclinations corresponding to the angle of view θ2 of the camera module 11 that reduce the likelihood of the top plate 122 of the housing 12 causing vignetting over subject light.

The camera module 11 may have the angle of view θ2 not greater than 180° in the front-rear direction. For example, the boundary B1 may be inclined toward the bottom surface 121a in an area frontward from the optical axis L of the lens 111 as described above, and the boundary B2 may not be inclined toward the bottom surface 121a in an area rearward from the optical axis L of the lens 111. In other words, the angle between the boundary B2 and the optical axis L of the lens 111 may be less than or equal to 90°. In other words, the angle of view θ2 may include a direction from the lens 111 toward the bottom surface 121a in an area of the angle of view θ2 in at least one direction (front direction) with respect to the optical axis L of the lens 111. In this case, the slope 122a has an inclination corresponding to the boundary B1 as described above. The portion rearward with respect to the optical axis L of the lens 111 may include the slope 122b described above, a surface parallel to the boundary B2, or a surface inclined to a degree not to intersect with the boundary B2. In other words, the top plate 122 may include a slope with an inclination corresponding to the angle of view θ2 and a surface without an inclination corresponding to the angle of view θ2.

Illuminators 16

The illuminators 16 are controlled by the control unit 31 to illuminate a subject by emitting illumination light toward the imaging range of the camera module 11 when the external environment is dark. The illuminators 16 are accommodated in the housing 12 and located below the illumination openings 126. Each illuminator 16 includes the light source 161 and the cover 162. Each light source 161 includes, for example, a light-emitting diode (LED) chip and an optical member above the LED chip, and emits light with a wavelength in the infrared region (infrared rays or infrared light). For imaging in a dark external environment, the imaging device 10 emits infrared light from the light sources 161 as illumination light to illuminate a subject. The illumination light emitted from the light sources 161 is not limited to infrared light, and may be visible light other than infrared light.

The covers 162 are formed from, for example, a light-transmissive resin and are each located above the corresponding light source 161. Each cover 162 has a surface covering at least an upper portion of the corresponding light source 161. Each cover 162 has a surface 163 fitted into the corresponding illumination opening 126. In this case, the covers 162 are attached with the surfaces 163 not protruding outward (upward) from the outer surface of the top plate 122 of the housing 12. Illumination light emitted from the light sources 161 is output from the imaging device 10 through the surfaces 163 of the covers 162.

As shown in FIG. 1, the imaging device 10 includes four illuminators 16 (illuminators 16a, 16b, 16c, and 16d) with the above structure. The illuminator 16a is located near one (left) end of the housing 12 and near the front end (in other words, in the slope 122a). The illuminator 16b is located near one (left) end of the housing 12 and near the rear end (in other words, in the slope 122b). The illuminator 16c is located near the other (right) end of the housing 12 and near the front end (in other words, in the slope 122a). The illuminator 16d is located near the other (right) end of the housing 12 and near the rear end (in other words, in the slope 122b). In other words, the imaging device 10 includes a pair of illuminators 16a and 16b in one direction (left) from the camera module 11 and a pair of illuminators 16c and 16d in the other direction (right) from the camera module 11.

The illuminators 16 may not be four illuminators 16, but may be, for example, two illuminators 16 located at the right front and the right rear from the camera module 11, or at the left front and the left rear from the camera module 11. In other words, the imaging device 10 may include two illuminators 16 in at least one end of the imaging device 10 in the right-left direction from the camera module 11.

As shown in FIG. 3B, the illuminator 16a is inclined frontward with respect to the optical axis L of the lens 111 in the front-rear direction. More specifically, the illuminator 16a is located with an optical axis La of the light source 161 in the illuminator 16a not parallel to the optical axis L of the lens 111 and orthogonal to the slope 122a of the top plate 122 of the housing 12. In other words, the illuminator 16a is located with the optical axis La of the light source 161 in the illuminator 16a orthogonal to the boundary B1 of the imaging range R2 of the camera module 11. The optical axis La of the light source 161 may not be orthogonal to the boundary B1 of the imaging range R2. The optical axis La of the light source 161 and the boundary B1 may simply intersect with each other.

As described above, the cover 162 in the illuminator 16a includes the surface 163 above the light source 161. The cover 162 is located with the surface 163 orthogonal to the optical axis La of the light source 161. In other words, the cover 162 is located with the surface 163 parallel to the boundary B1 of the imaging range R2 of the camera module 11. In other words, the surface 163 of the cover 162 is parallel to the slope 122a of the top plate 122 of the housing 12. Thus, the illuminator 16a is parallel to the slope 122a of the top plate 122 of the housing 12. In some embodiments, the illuminator 16a may not be parallel to the slope 122a.

The illuminator 16b is inclined rearward with respect to the optical axis L of the lens 111 in the front-rear direction. More specifically, the illuminator 16b is located with an optical axis Lb of the light source 161 in the illuminator 16b not parallel to the optical axis L of the lens 111 and orthogonal to the slope 122b of the top plate 122 of the housing 12. In other words, the illuminator 16b is located with the optical axis Lb of the light source 161 in the illuminator 16b orthogonal to the boundary B2 of the imaging range R2 of the camera module 11. The optical axis Lb of the light source 161 may not be orthogonal to the boundary B2 of the imaging range R2. The optical axis Lb of the light source 161 and the boundary B2 may simply intersect with each other.

As described above, the cover 162 in the illuminator 16b includes the surface 163 above the light source 161. The cover 162 is located with the surface 163 orthogonal to the optical axis Lb of the light source 161. In other words, the cover 162 is located with the surface 163 of the cover 162 in the illuminator 16b parallel to the boundary B2 of the imaging range R2 of the camera module 11. In other words, the surface 163 of the cover 162 in the illuminator 16b is parallel to the slope 122b of the top plate 122 of the housing 12. Thus, the illuminator 16b is parallel to the slope 122b of the top plate 122 of the housing 12. In some embodiments, the illuminator 16b may not be parallel to the slope 122b.

As described above, in the front-rear direction, the illuminator 16a is inclined frontward with respect to the optical axis L of the lens 111, and the illuminator 16b is inclined rearward with respect to the optical axis L of the lens 111. Thus, illumination light emitted from the illuminator 16a and illumination light emitted from the illuminator 16b travel in directions away from each other and away from the center of the imaging device 10. This reduces the likelihood of interference between illumination light emitted from the illuminator 16a and illumination light emitted from illuminator 16b, allowing a subject to be illuminated without, for example, interference fringes caused by the illumination light. In addition, the illuminator 16a is parallel to the slope 122a of the top plate 122 of the housing 12, and the illuminator 16b is parallel to the slope 122b of the top plate 122 of the housing 12. The illuminators 16a and 16b do not protrude outside the imaging device 10 from the top plate 122. Thus, the illuminators 16a and 16b with this structure are less likely to cause vignetting over subject light.

The illuminator 16c is located in the same manner as the illuminator 16a. The illuminator 16d is located in the same manner as the illuminator 16b. This reduces the likelihood of interference between illumination light emitted from the illuminator 16c and illumination light emitted from the illuminator 16d. The illuminators 16c and 16d with this structure are less likely to cause vignetting over subject light.

Control Unit 31

The control unit 31 includes components such as a central processing unit (CPU) and a memory, and is mounted on a substrate 31a located frontward inside the housing 12. The control unit 31 is a processor that may read and execute a control program prestored in a storage medium, such as a flash memory, to control the operations of the camera module 11 and the illuminators 16. The control unit 31 controls the components in the normal imaging mode or the low-light imaging mode in an imaging process to operate the components. The normal imaging mode is used when the external environment of the imaging device 10 is bright. The low-light imaging mode is used when the external environment of the imaging device 10 is dark and lacks a sufficient amount of light. In the low-light imaging mode, the control unit 31 controls the illuminators 16 to apply infrared light as illumination light and the camera module 11 to capture an image of a subject illuminated with the infrared light.

The structure according to the above embodiment produces the advantageous effects described below.

(1) The top plate 122 that is an outer surface of the housing 12 includes the slopes 122a and 122b each with an inclination in the first direction (front-rear direction) corresponding to the angle of view. The covers 162 in the illuminators 16 are parallel to the slope 122a or 122b. This allows subject light to reach the camera module 11 without vignetting caused by the housing 12 or the covers 162 in the illuminators 16. The imaging device 10 can thus capture an image of a subject with an angle of view greater than 180°. The covers 162 in the illuminators 16 parallel to the slope 122a or 122b provide a space for accommodating other components of the imaging device 10, allowing the imaging device 10 to be smaller.

(2) The top plate 122 includes the slope 122a in one side (front portion) of the top plate 122 and the slope 122b in the other side (rear portion) of the top plate 122 in the first direction (front-rear direction) with respect to the first reference position P1 extending through the optical axis L of the lens 111 in the right-left direction (second direction) orthogonal to the front-rear direction. This allows subject light from the imaging range R2 with the angle of view θ2 greater than 180° in the front-rear direction to reach the camera module 11 without vignetting caused by the housing 12.

(3) The optical axes of the light sources 161 in the illuminators 16a and 16c located on the slope 122a are orthogonal to the slope 122a. The optical axes of the light sources 161 in the illuminators 16b and 16d located on the slope 122b are orthogonal to the slope 122b. Thus, illumination light emitted from the illuminator 16a and illumination light emitted from the illuminator 16b travel in directions away from each other and away from the center of the imaging device 10. This reduces the likelihood of interference between illumination light emitted from the illuminator 16a and illumination light emitted from the illuminator 16b, allowing a subject to be illuminated without, for example, interference fringes caused by the illumination light.

(4) The pair of illuminators 16a and 16b are located at one (left) end of the top plate 122 in the right-left direction (second direction). The pair of illuminators 16c and 16d are located at the other (right) end of the top plate 122 in the right-left direction (second direction). This allows illumination of the imaging range in the right-left direction, thus reducing degradation of the quality of images generated in a dark environment.

The above embodiment may be modified in the forms described below.

First Modification

The top plate 122 of the housing 12 in the embodiment includes the slopes 122a and 122b in the front-rear direction. However, the top plate 122 is not limited to this shape. In other words, the top plate 122 may be shaped to be parallel to the boundaries B1 and B2 of the imaging range R2 of the camera module 11 in the front-rear direction.

Figure 4A:
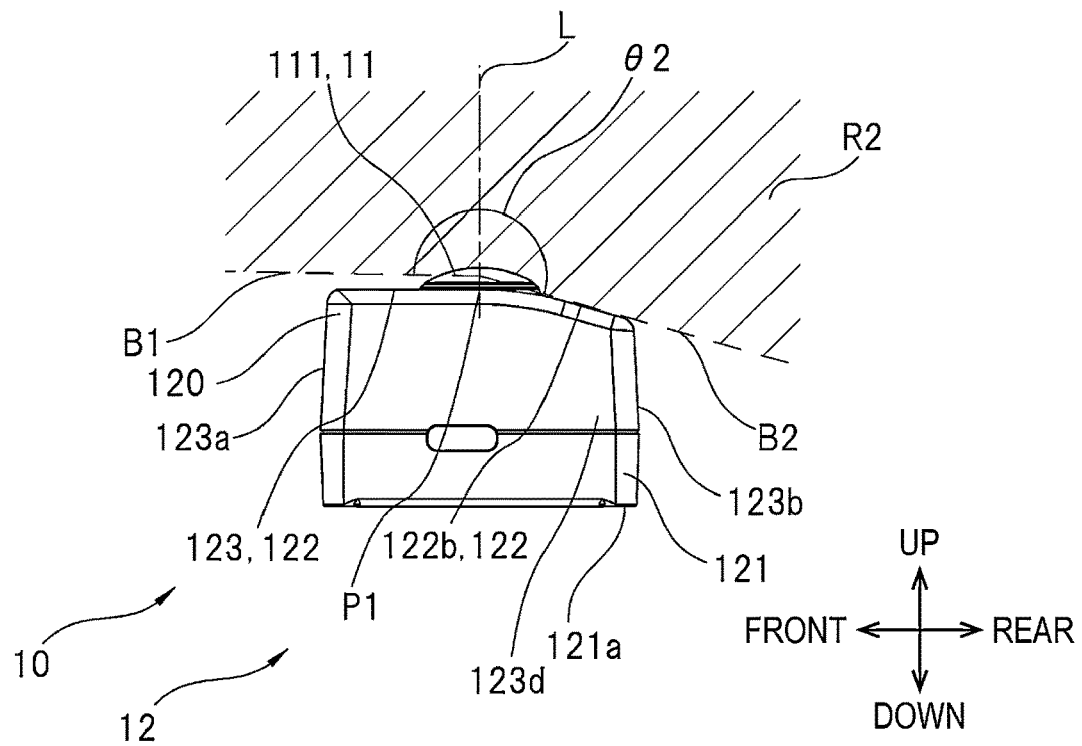
FIG. 4A is a left side view of an imaging device according to a first modification.

FIG. 4A is a left side view of an imaging device 10 according to a first modification. In the first modification, the imaging range R2 of the camera module 11 is the area defined by the boundary B1 orthogonal to the optical axis L of the lens 111 in the front portion of the imaging device 10 and the boundary B2 inclined downward with respect to the optical axis L of the lens 111 in the rear portion of the imaging device 10. In this case, the top plate 122 includes the slope 122b parallel to the boundary B2 in its portion (the other side) from the first reference position P1 to the rear end. The top plate 122 includes no slope but includes a flat surface 123 parallel to the boundary B1 in its portion (one side) from the first reference position P1 to the front end.

In this case, the illuminators 16b and 16d located in the rear portion of the top plate 122 are attached parallel to the slope 122b, as in the embodiment. The illuminators 16a and 16c located in the front portion of the top plate 122 are attached parallel to the flat surface 123 parallel to the boundary B1. In other words, the illuminators 16 are also attached parallel to the top plate 122 in the first modification. The illuminators 16a and 16c located in the front portion of the top plate 122 may not be attached parallel to the flat surface 123 parallel to the boundary B1.

The imaging range R2 of the camera module 11 may be an area defined by the boundary B1 inclined downward with respect to the optical axis L of the lens 111 in the front portion of the imaging device 10 and the boundary B2 orthogonal to the optical axis L of the lens 111. In this case, the top plate 122 includes the slope 122a parallel to the boundary B1 in its portion (one side) from the first reference position P1 to the front end, as in the embodiment. The top plate 122 has a flat surface parallel to the boundary B2 in its portion (the other side) from the first reference position P1 to the rear end. In other words, the top plate 122 may include a slope in at least one of the two sides of the top plate 122 in the front-rear direction (first direction) with respect to the first reference position P1.

Second Modification

Figure 4B:
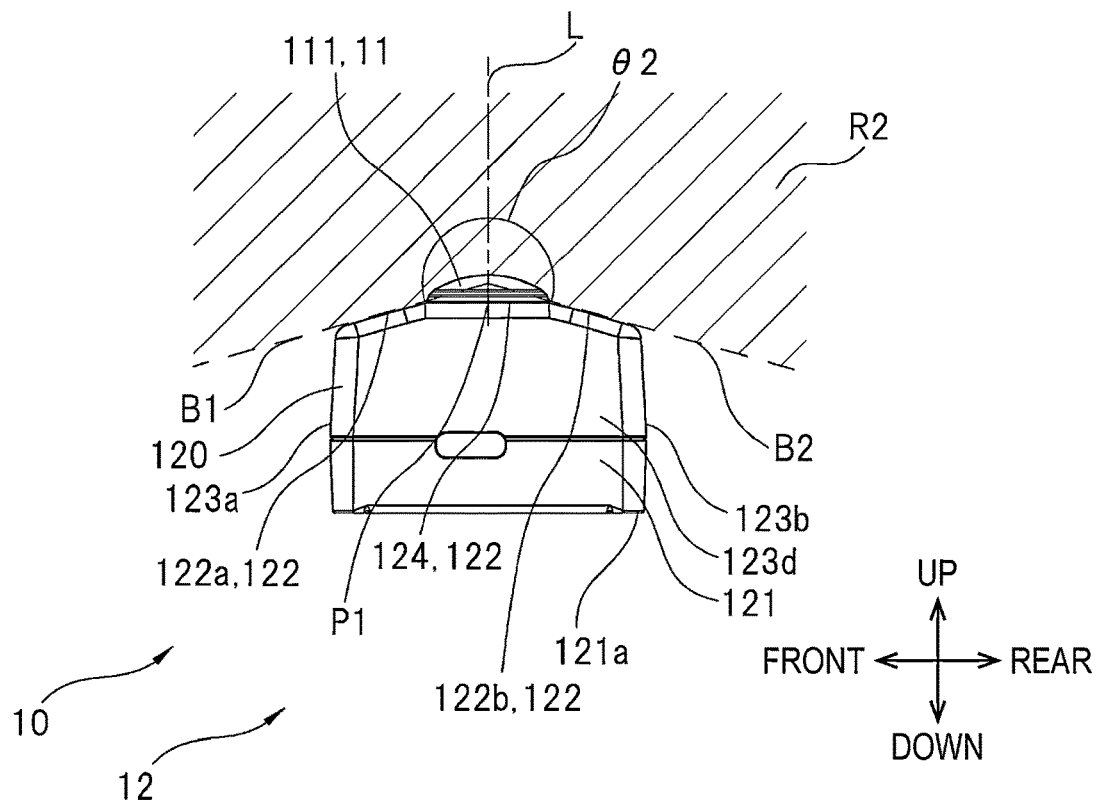
FIG. 4B is a left side view of an imaging device according to a second modification.

FIG. 4B is a left side view of an imaging device 10 according to a second modification. In the second modification, the imaging range R2 of the camera module 11 is the area defined by the boundaries B1 and B2 inclined downward with respect to the optical axis L of the lens 111, as in the embodiment. However, the top plate 122 has, in a portion including the first reference position P1 and not intersecting with the boundaries B1 and B2, a flat surface 124 orthogonal or substantially orthogonal to the optical axis L of the lens 111. The slope 122a parallel to the boundary B1 extends from the front end of the flat surface 124 to the front end of the top plate 122. The slope 122b parallel to the boundary B2 extends from the rear end of the flat surface 124 to the rear end of the top plate 122. The top plate 122 with this shape also allows subject light to reach the camera module 11 without vignetting as in the embodiment.

In the second modification, the illuminators 16 are attached in the same manner as in the embodiment. In other words, the illuminators 16a and 16c are attached parallel to the slope 122a, and the illuminators 16b and 16d are attached parallel to the slope 122b.

Third Modification

In the embodiment and the first and second modifications described above, the camera module 11 has the imaging range R2 with the angle of view greater than 180° in the front-rear direction. The camera module 11 may also have an imaging range R1 with the angle of view greater than 180° in the right-left direction.

Figure 5:
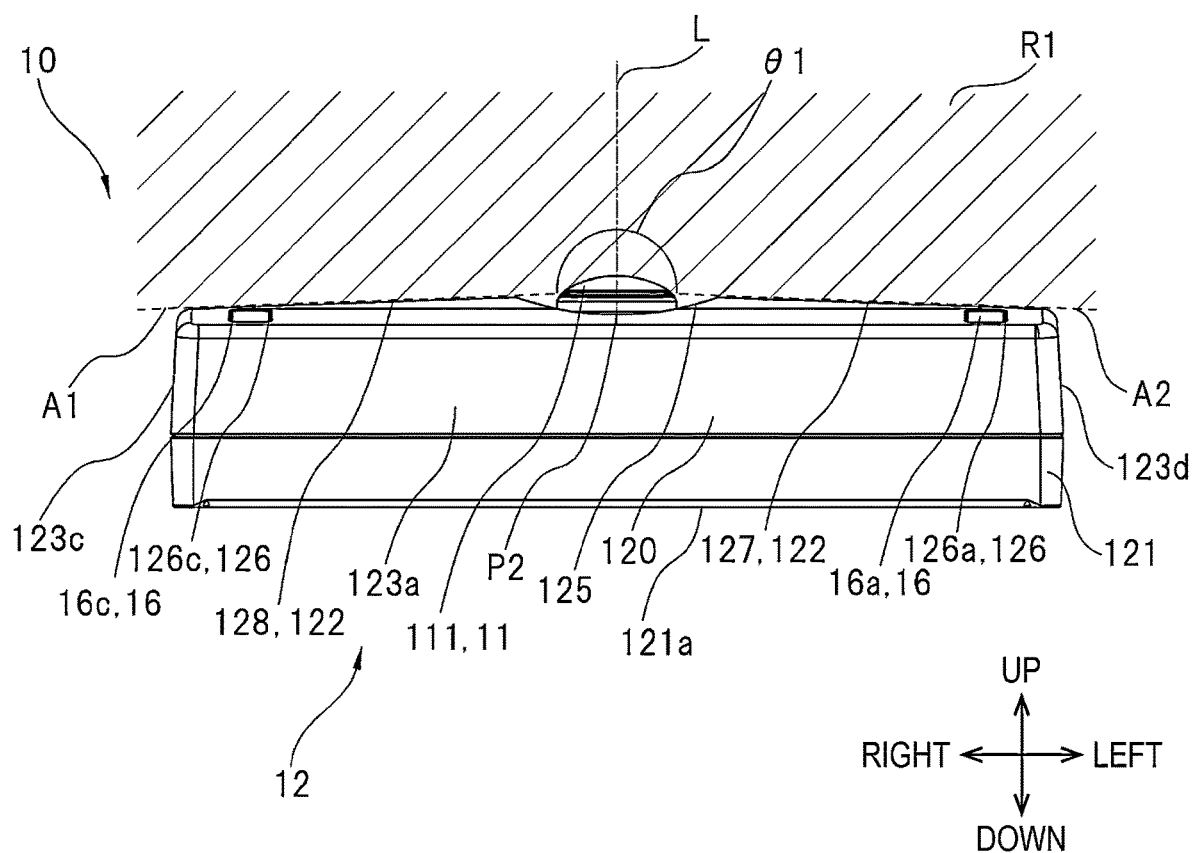
FIG. 5 is a front view of an imaging device according to a third modification.

FIG. 5 is a front view of an imaging device 10 according to a third modification. In the third modification, the imaging range R1 is the area defined by the boundaries A1 and A2 having an angle of view θ1 greater than 180°. The top plate 122 includes a slope 128 parallel to the boundary A1 in one side (right portion) of the top plate 122 in the right-left direction with respect to a second reference position P2. The second reference position P2 is a position on a line extending in the front-rear direction (first direction) through the center of the top plate 122 (the optical axis L of the lens 111). The top plate 122 also includes a slope 127 parallel to the boundary A2 in the other side (left portion) of the top plate 122 in the right-left direction with respect to the second reference position P2. This reduces the likelihood of vignetting over subject light caused by the housing 12 in the imaging device 10 with the angle of view θ1 in the right-left direction greater than 180°.

The imaging range R1 of the camera module 11 may also be an area defined by the boundary A1 orthogonal to the optical axis L of the lens 111 in the right portion of the imaging device 10 and the boundary A2 inclined downward with respect to the optical axis L of the lens 111 in the left portion of the imaging device 10. In this case, the top plate 122 includes the above slope 127 in the left portion from the center of the top plate 122. The top plate 122 may include, in the right portion of the top plate 122 from the center, no slope but include a flat surface parallel to the boundary A1, or in other words, a flat surface orthogonal to the optical axis L of the lens 111.

For the imaging range R1 of the camera module 11 being the area defined by the boundary A1 inclined downward and the boundary A2 orthogonal to the optical axis L of the lens 111, the top plate 122 may include the slope 128 described above in a portion from the center of the top plate 122 to the right end of the top plate 122 and a flat surface parallel to the boundary A2 in a portion from the center to the left end of the top plate 122. In other words, the top plate 122 may include a slope in at least one of the two sides (right and left portions) of the top plate 122 in the second direction (right-left direction) with respect to the second reference position P2.

The angle of view θ1 of the camera module 11 in the right-left direction may not be greater than 180°. For example, the boundary A1 may be inclined downward (toward the bottom surface 121a) in the portion rightward from the optical axis L of the lens 111 as described above, and the boundary A2 may not be inclined toward the bottom surface 121a in the portion leftward from the optical axis L. In other words, the angle between the boundary A2 and the optical axis L of the lens 111 may be less than or equal to 90°. In other words, the angle of view θ1 may include a direction from the lens 111 toward the bottom surface 121a in an area of the angle of view θ1 in at least one direction (right direction) with respect to the optical axis L of the lens 111. In this case, the slope 128 has an inclination corresponding to the boundary A1 as described above. The portion leftward from the optical axis L of the lens 111 may include the slope 127 described above, a surface parallel to the boundary A2, or a surface inclined to a degree not to intersect with the boundary A2. In other words, the top plate 122 may include a slope with an inclination corresponding to the angle of view θ1 and a surface without an inclination corresponding to the angle of view θ1.

In the imaging device 10 according to the third modification, the top plate 122 has the same shape as the top plate 122 described in the embodiment, the first modification, or the second modification in the front-rear direction.

Fourth Modification

Although the imaging device 10 according to the embodiment and the modifications described above includes the illuminators 16 that emit illumination light through the illumination openings 126 in the top plate 122, the structure is not limited to this example. The imaging device 10 may further include illuminators 16 in a sidewall plate of the front case 120.

Figure 6:
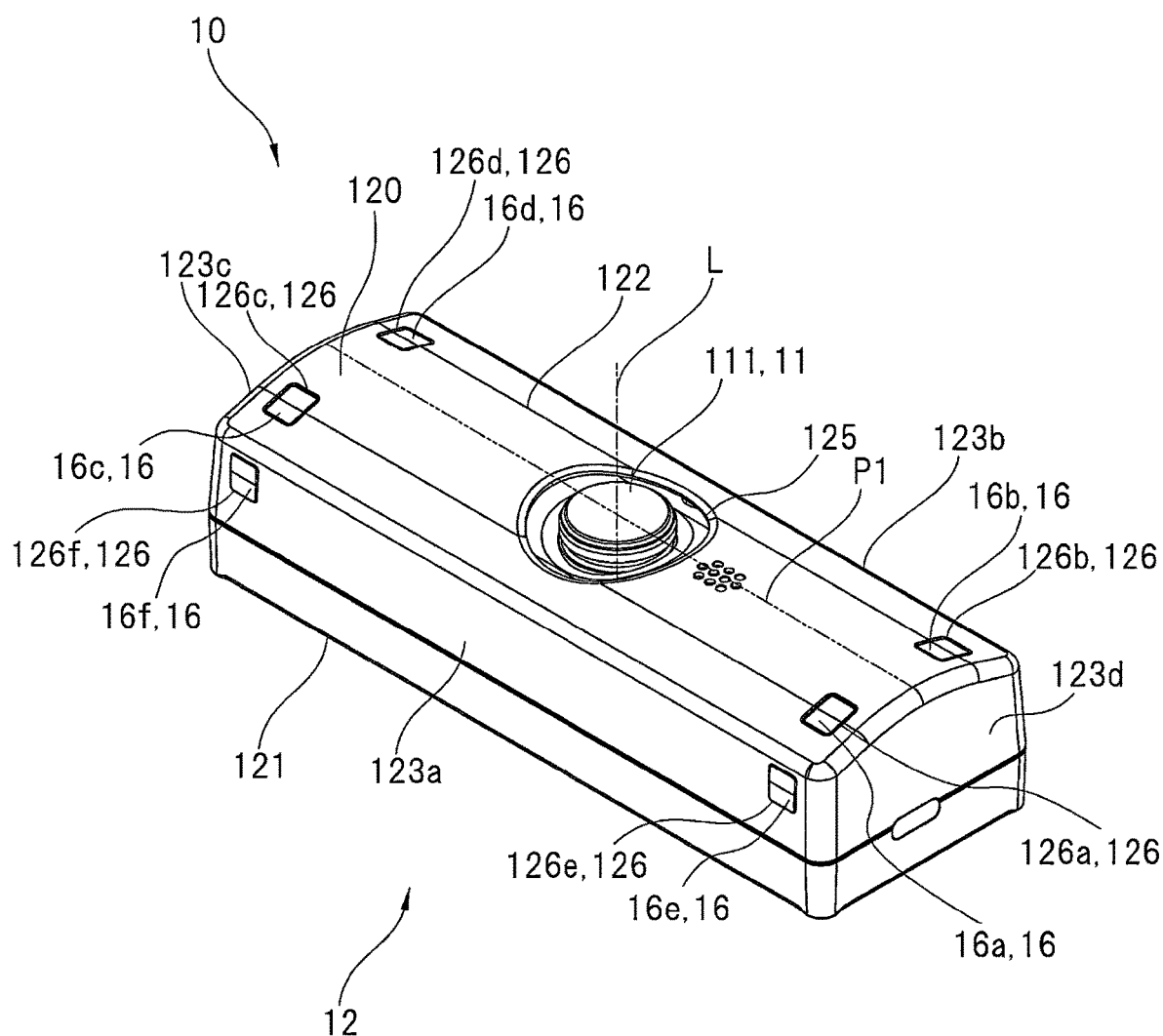
FIG. 6 is an external perspective view of an imaging device according to a fourth modification.
Figure 6:
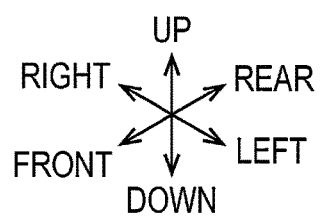

FIG. 6 is an external perspective view of an imaging device 10 according to a fourth modification. In the fourth modification, the sidewall plate 123a of the front case 120 also has illumination openings 126. More specifically, the sidewall plate 123a has an illumination opening 126e at the left and an illumination opening 126f at the right. The imaging device 10 according to the fourth modification further includes, in addition to the illuminators 16a to 16d, illuminators 16e and 16f with the same structure as the illuminators 16a to 16d. The cover 162 in the illuminator 16e is fitted into the illumination opening 126e in the sidewall plate 123a. The cover 162 in the illuminator 16f is fitted into the illumination opening 126f in the sidewall plate 123a. The illuminators 16e and 16f emit illumination light outside through the sidewall plate 123a. This allows a wider area than in the embodiment to be illuminated, thus allowing a high quality image to be captured in the imaging range R1 with the angle of view greater than 180°.

The sidewall plate 123a may include an illuminator 16 at either the left or the right. In addition to the sidewall plate 123a, at least one of the sidewall plate 123b, 123c, or 123d may include one or more additional illuminators 16, or at least one of the sidewall plate 123b, 123c, or 123d other than the sidewall plate 123a may include one or more additional illuminators 16. In other words, at least one of the four side plates, or the sidewall plate 123a, 123b, 123c, or 123d, may include one or more additional illuminators 16.

Although various embodiments and modifications are described above, the present invention is not limited to the embodiments and the modifications. Other forms implementable within the scope of technical idea of the present invention fall within the scope of the present invention.

What is claimed is:

1. An imaging device, comprising:
   an imaging element configured to receive subject light;
   an optical member configured to direct, to the imaging element, the subject light from an imaging range having a predetermined angle of view in at least a first direction;
   at least one illuminator including a light source configured to emit illumination light toward the imaging range and a cover covering the light source; and
   a housing including an outer plate on a plane intersecting with an optical axis of the optical member and a bottom surface facing the outer plate, the housing accommodating the imaging element and the at least one illuminator,
   wherein the predetermined angle of view includes a direction from the optical member toward the bottom surface in an area of the predetermined angle of view in at least one direction with respect to the optical axis of the optical member,
   the outer plate includes a slope with an inclination corresponding to the predetermined angle of view,
   the cover in the at least one illuminator is parallel to the slope,
   the outer plate includes the slope in at least one of two sides of the outer plate in a first direction with respect to a first reference position on a line extending, through the optical axis of the optical member, in a second direction orthogonal to the first direction, and
   the optical member protrudes from the outer plate in a direction away from the imaging element to a location where the slope of a first side of the at least two sides intersections the slope of a second side of the at least two sides.

2. The imaging device according to claim 1, wherein
   the outer plate includes, in the first direction, a flat surface intersecting with the optical axis in a portion including the first reference position.

3. The imaging device according to claim 1, wherein
   the optical member directs, to the imaging element, the subject light from the imaging range having the predetermined angle of view in the second direction,
   the predetermined angle of view in the second direction includes a direction from the optical member toward the bottom surface in an area of the predetermined angle of view in at least one direction with respect to the optical axis of the optical member, and
   the outer plate includes the slope in at least one side of the outer plate in the second direction with respect to a second reference position on a line extending in the first direction through the optical axis of the optical member.

4. The imaging device according to claim 1, wherein
   the at least one illuminator is a plurality of illuminators located on the slope, and the light source in each of the plurality of illuminators has an optical axis orthogonal to the slope.

5. The imaging device according to claim 4, wherein
   the plurality of illuminators include one pair of illuminators located in one side of the outer plate in a second direction orthogonal to the first direction and another pair of illuminators located in another side of the outer plate in the second direction.

6. The imaging device according to claim 5, wherein
   the housing includes a plurality of sidewall plates adjoining the outer plate, and
   the plurality of illuminators include an illuminator located on a sidewall plate of the plurality of side wall plates.

* * * * *